United States Patent
Erickson

(10) Patent No.: US 8,272,661 B2
(45) Date of Patent: Sep. 25, 2012

(54) GOOSENECK HITCH ASSEMBLY

(76) Inventor: Nick Erickson, Boone, IA (US)

(*) Notice: Subject to any disclaimer, the term of this patent is extended or adjusted under 35 U.S.C. 154(b) by 0 days.

(21) Appl. No.: 12/949,460

(22) Filed: Nov. 18, 2010

(65) Prior Publication Data

US 2012/0126509 A1    May 24, 2012

(51) Int. Cl.
*B62D 53/06* (2006.01)
(52) U.S. Cl. .................. 280/441.2; 280/511
(58) Field of Classification Search .......... 280/441.2, 280/491.5, 511, 901, 491.1, 433, 514, 423.1, 280/425.2
See application file for complete search history.

(56) References Cited

U.S. PATENT DOCUMENTS

| | | | | |
|---|---|---|---|---|
| 3,336,051 A | * | 8/1967 | Dale | 280/423.1 |
| 3,893,713 A | * | 7/1975 | Ivy | 280/511 |
| 5,016,898 A | * | 5/1991 | Works et al. | 280/433 |
| 5,160,157 A | * | 11/1992 | Hubler | 280/423.1 |
| 5,472,222 A | | 12/1995 | Marcy | |
| 5,577,751 A | * | 11/1996 | Matthews | 280/415.1 |
| 5,860,671 A | | 1/1999 | Mackeown | |
| 5,971,418 A | * | 10/1999 | Lindenman et al. | 280/491.1 |
| 6,095,545 A | | 8/2000 | Bol, II et al. | |
| 6,099,015 A | * | 8/2000 | Marcy | 280/433 |
| 6,520,528 B2 | | 2/2003 | Fandrich et al. | |
| 6,533,308 B1 | * | 3/2003 | Tambornino | 280/491.1 |
| 6,695,338 B1 | * | 2/2004 | Roberts | 280/491.5 |
| 6,837,511 B1 | | 1/2005 | Johnson, III | |
| 6,969,090 B1 | * | 11/2005 | Works | 280/407 |
| 7,168,727 B2 | * | 1/2007 | Dick | 280/491.5 |
| 2002/0060443 A1 | * | 5/2002 | Fandrich et al. | 280/495 |
| 2003/0042708 A1 | * | 3/2003 | Tambornino | 280/491.1 |
| 2004/0160037 A1 | | 8/2004 | Dick | |

OTHER PUBLICATIONS

B&W, Turnover Ball Gooseneck Hitch, Product Advertisement.

* cited by examiner

*Primary Examiner* — Tashiana Adams
(74) *Attorney, Agent, or Firm* — Davis Brown Law Firm; Emily Harris

(57) ABSTRACT

A gooseneck hitch assembly is provided for attaching to a towing vehicle. The hitch assembly generally includes a hitch ball head assembly and retaining assembly for receiving and securing the hitch ball head assembly. The retaining assembly includes a channel coupled to a locking collar. Once the hitch ball head assembly is inserted into the channel, the collar is released and resilient members guide the collar to its offset resting position to lock the hitch ball head assembly in place. Alternatively, the collar is released and resilient members guide a lever into a circumscribed groove of the hitch ball head assembly, thereby locking the hitch ball head assembly in place. The hitch ball head is removable and may be selectively received by the retaining assembly in both towing and inverted positions. Optionally, the hitch assembly may be protected or covered by a housing.

22 Claims, 13 Drawing Sheets

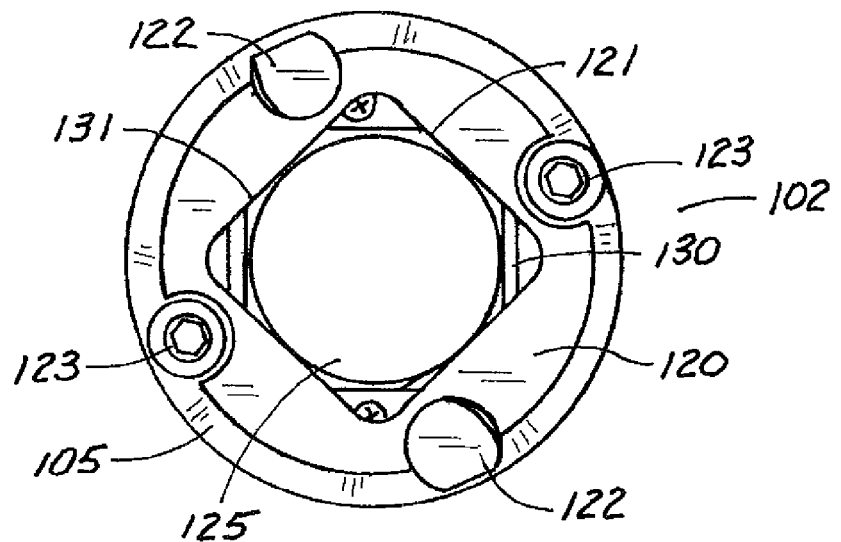
Figure 5
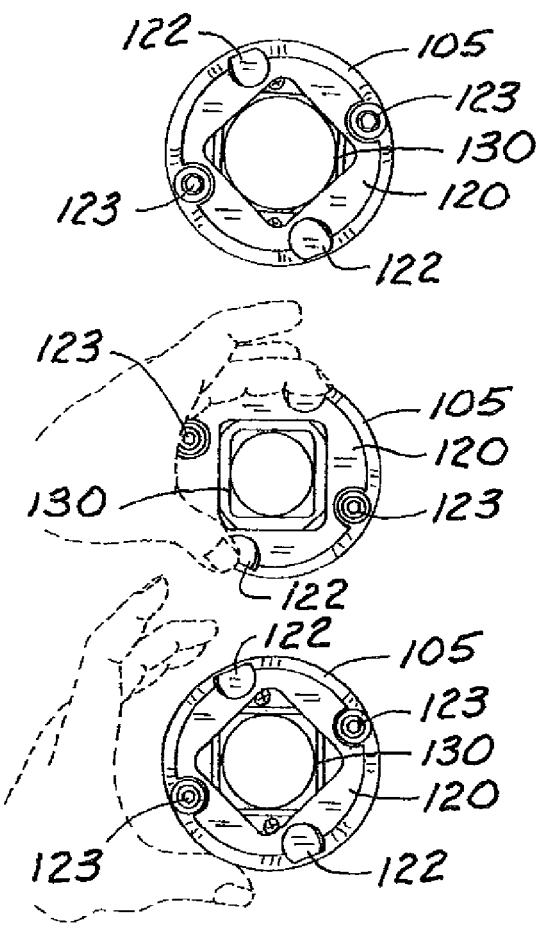
Figures 6 a-c

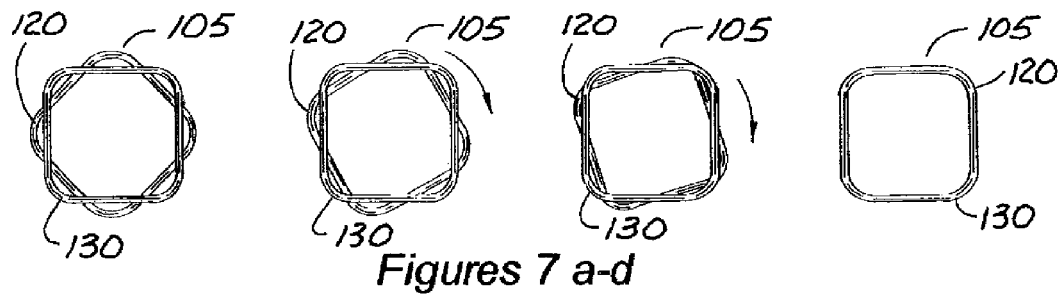
Figures 7 a-d
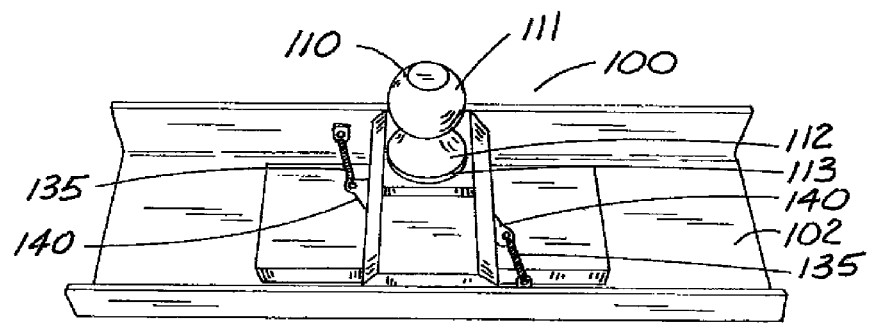
Figure 8
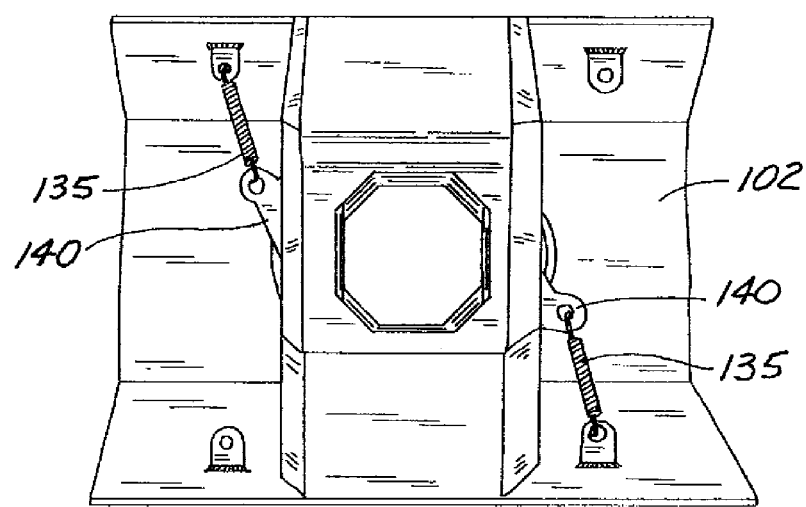
Figure 9

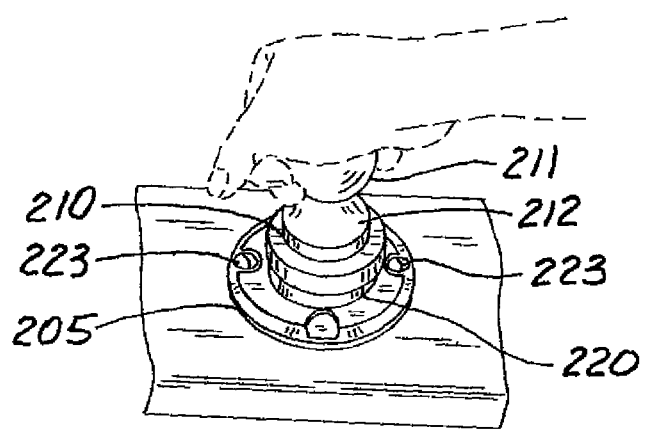
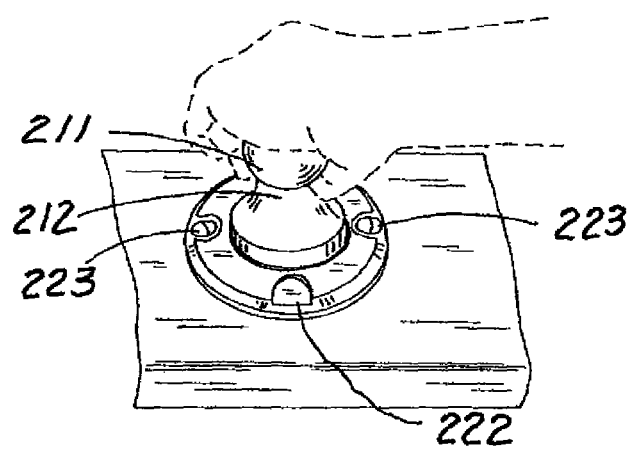
Figures 14 a-b
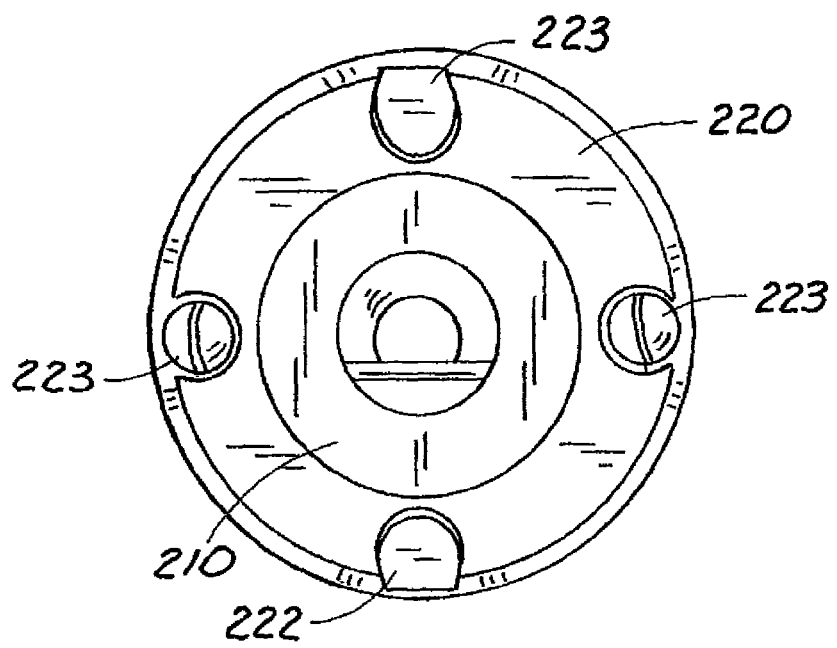
Figure 15

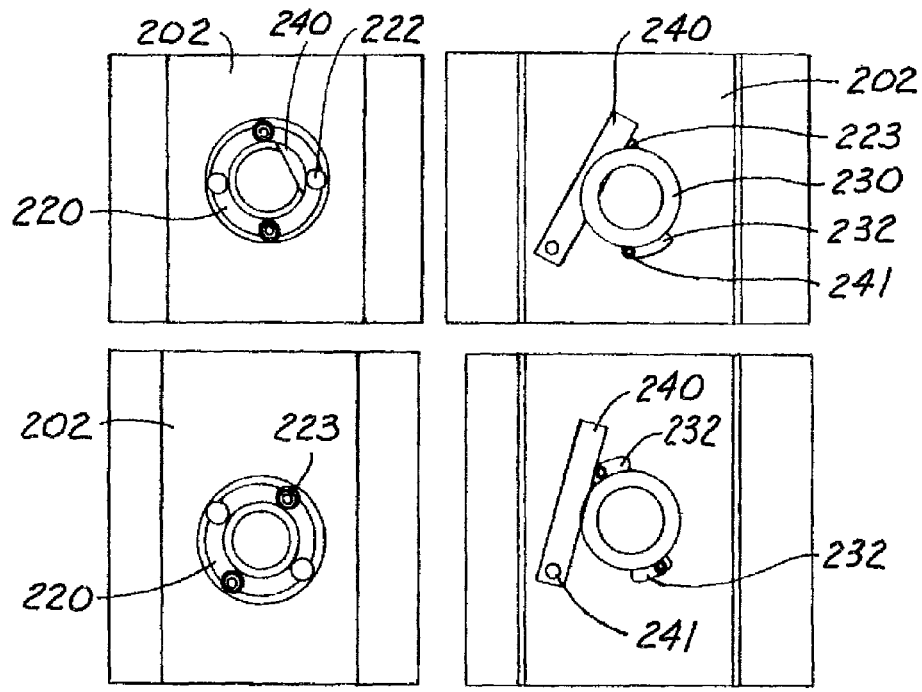
Figures 16 a-b
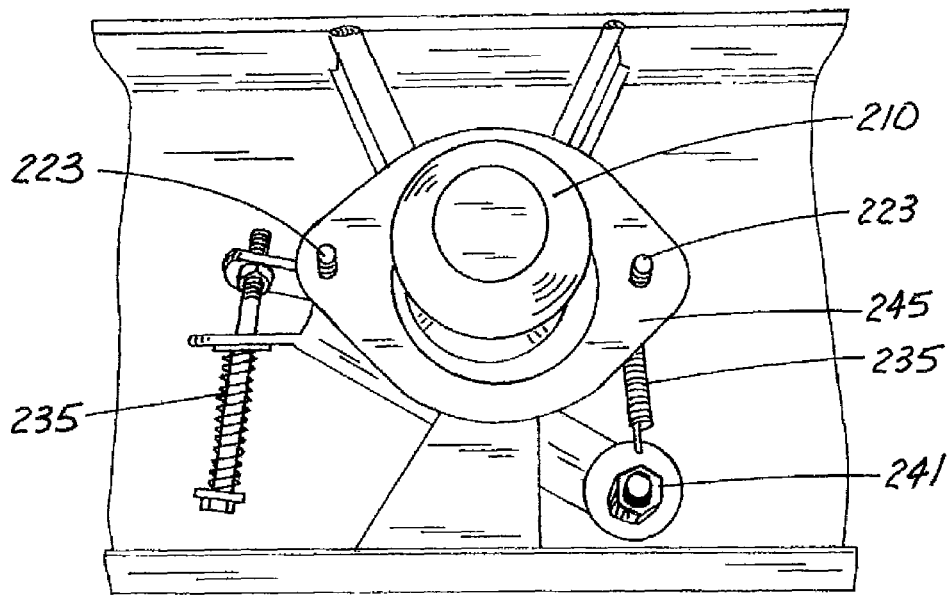
Figure 17

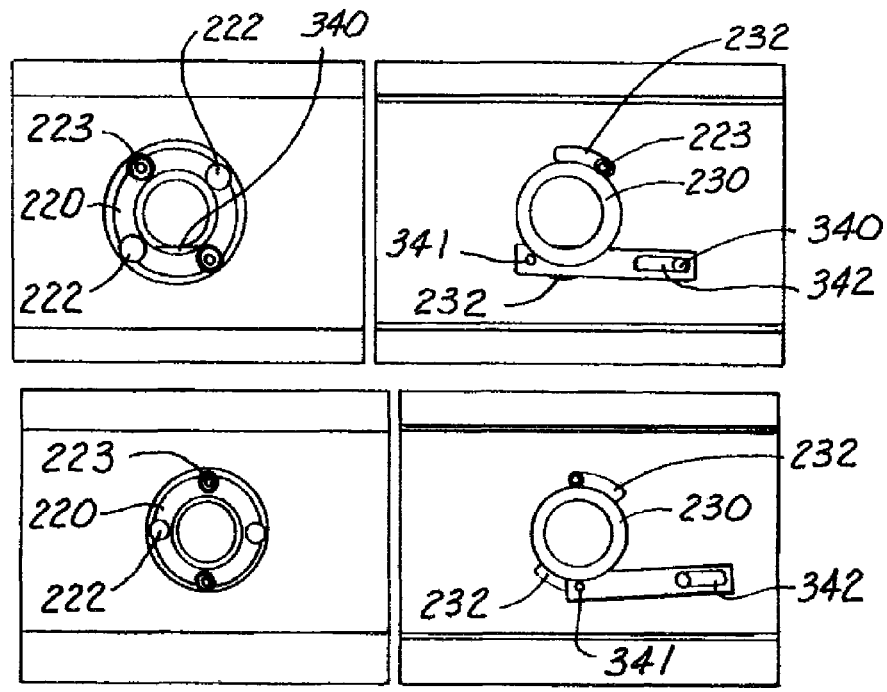
Figures 18 a-b
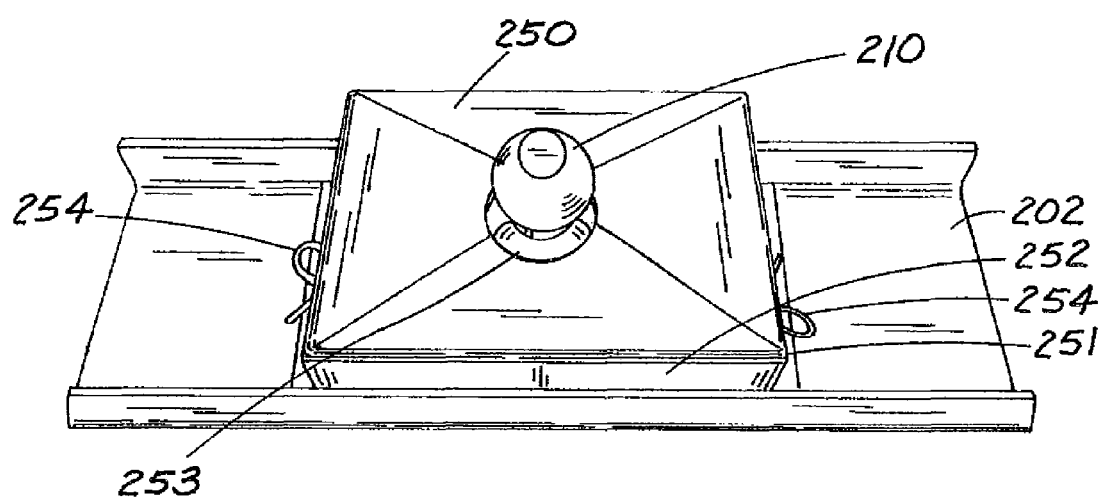
Figure 19

GOOSENECK HITCH ASSEMBLY

BACKGROUND OF THE INVENTION

1. Field of the Invention

The present invention relates generally to hitch assemblies. The invention more particularly relates to gooseneck hitch assemblies having a hitch ball head assembly that can be stored in an inverted position to prevent the hitch ball head assembly from obstructing, for example, the cargo bed of the towing vehicle when the hitch is not in use.

2. Description of Related Art

Trailer hitch assemblies are commonly attached to towing vehicles for towing gooseneck trailers. Gooseneck trailers generally have a bent neck for coupling to a hitch in the bed of a towing vehicle. As such, the bed of the towing vehicle must include a hitch ball head assembly to receive the trailer coupler. Consequently, when the vehicle is not used for towing, the hitch ball head assembly continues to obstruct the bed surface.

Accordingly, attempts have been made in the art to provide a gooseneck hitch that is secure yet positionable such that the surface of the towing vehicle is not obstructed when the hitch is not in use. For example, U.S. Pat. No. 5,016,898 (granted May 21, 1991 to Works et al.) discloses a conventional hitch assembly containing a hitch ball head assembly positioned within a retention sleeve mounted below and through the cargo bed of a towing vehicle. The hitch ball head assembly is secured in place with a spring biased locking pin that is received within a hole in the hitch sleeve. The hitch ball head assembly may be positioned in a towing position or inverted into a stored position to allow for a flat surface when not towing. However, the locking assembly is actuated with a handle positioned outside the cargo area in the wheel well of the towing vehicle. Additionally, because the locking assembly needs to be actuated before and after removing the hitch ball head assembly, the operator must access the wheel well at least twice. Moreover, the security of the hitch may be compromised if the operator forgets to re-actuate the assembly. Therefore, operation of this conventional hitch assembly is time consuming, inconvenient, cumbersome, and complicated.

Similarly, U.S. Pat. No. 7,168,727 (granted Jan. 30, 2007 to Dick) discloses a conventional gooseneck hitch assembly containing a frame supporting a housing which receives the hitch ball head assembly in either an upright towing position or an inverted storage position. The hitch ball head assembly is locked in place when a locking pin extends into a groove in the hitch ball head assembly. However, the user must manually activate the locking mechanism before and after placement from a location spaced apart from the hitch ball head assembly and usually located in the wheel well of the towing vehicle. This leads to time consuming, inconvenient, complicated, and cumbersome operation as the operator must climb up and down from the truck bed several times.

Also, U.S. Pat. No. 3,893,713 (granted Jul. 8, 1975 to Ivy) describes a locking plate system. A first lock plate is moved to align with the receiving channel in order to insert the hitch ball head assembly. Once the hitch ball head assembly is inserted, the lock plate slides so that a smaller opening secures the hitch ball head assembly in place. However, this system requires the user to remember to manually activate a remote latch to lock the plate in place before and after positioning the hitch ball head assembly.

Some patents disclose hitch assemblies that attempt to eliminate the cumbersome step of manually activating the locking mechanism from outside the towing vehicle by involving the use of levers, latches, or pins to hold the hitch ball head assembly within a receiving channel. For example, U.S. Pat. No. 6,099,015 (granted Aug. 8, 2000 to Marcy) describes a hitch system containing a sleeve secured to a mounting bracket with a vertical slot in the wall of the sleeve. The hitch ball head assembly has a locking pin that extends into the slot. Turning the hitch ball head assembly positions the locking pin within a second slot to lock and secure the hitch ball head assembly in place. To remove and unlock the hitch ball head assembly, the hitch ball head assembly is again rotated to navigate the locking pin through the two slots. However, the outward projecting pin configuration is easily susceptible to being damaged when manipulating the hitch ball head assembly, and the configuration of the slots lends itself to debris thereby making activation of the locking pin more difficult over time.

Similarly, U.S. Pat. No. 5,860,671 (granted Jan. 19, 1999 to Mackeown) describes a related system where the hitch ball head assembly contains pins, and the sleeve contains slots to receive the pins. As the ball is inserted and turned into the sleeve, the pins lock within the sleeve slots. Again, however, the outward projecting pins may be easily susceptible to damage over time. Moreover, the assembly contains a handle attached to the hitch ball head assembly which may obstruct the surface of the towing vehicle.

Additionally, U.S. Pat. No. 5,472,222 (granted Dec. 5, 1995 to Marcy) describes a variation of the pin channel system of U.S. Pat. No. 6,099,015. The hitch ball head assembly and socket are removably attached to a sleeve in a frame. A spring biased pin attached to the sleeve engages in channels within the exterior of the socket. The hitch ball head assembly can be removed or inverted by aligning the pin with an exit portion of the channel. However, it may be difficult to align the pin and exit portion of the channel for easy removal or inversion of the hitch ball head assembly. Further, the pin is not positioned to allow a user to visibly confirm that the hitch ball head assembly is securely locked in place, thereby reducing confidence in a secured hitch assembly.

Also, U.S. Pat. No. 6,695,338 (granted Feb. 24, 2004 to Roberts) discloses a gooseneck hitch assembly where the hitch ball head assembly has pins and the sleeve has slots to receive the pins. The hitch ball head assembly is rotated to lock the pins within the sleeve slots. However, to remove the hitch ball head assembly, the user must first twist the hitch ball head assembly until the pins align with vertical portions of the slot, and then the user must pull the hitch ball head assembly out. This requires precision alignment and may require the user to exert additional force if the pins do not correctly align. Moreover, the pins are again susceptible to damage due to their outward projecting configuration.

Also, U.S. Pat. No. 6,837,511 (granted Jan. 4, 2005 to Johnson) describes a cam-locking removable hitch. The hitch ball head assembly includes lugs or cams which fit into grooves or openings in the corresponding sleeve to lock the hitch ball head assembly in place. However, the hitch assembly also includes a handle to aid in removing the hitch ball head assembly. This handle may obstruct the towing vehicle and may more easily break under excessive use or force. Moreover, the hitch ball head assembly cannot be stored in an inverted position which requires the user to completely remove the hitch ball head assembly in order to obtain a cargo bed free of obstructions. However, this leaves a gaping hole in the cargo bed where the head assembly once sat.

While these gooseneck hitch assemblies have the advantage of providing a hitch when towing is required while allowing the removal or inversion of the hitch ball head assembly when not in use, the prior art presents numerous disadvantages that are addressed by the present invention. Accordingly, a need exists for a device that has the capability to secure a hitch ball head assembly in place in a towing or inverted position.

SUMMARY OF THE INVENTION

One object of the present invention is to provide a gooseneck hitch.

A further object of the present invention is to provide a gooseneck hitch capable of selectively securing the hitch ball head assembly in an upright towing position or an inverted stored position.

Another object of the present invention is to provide a hitch assembly which permits the hitch ball head assembly to be easily moved from a towing position to an inverted storage position so that the hitch assembly will permit full use of the bed surface of the towing vehicle when the hitch assembly is not in use.

An additional object of the present invention is to provide a device that allows users to easily and quickly remove, set, and lock the gooseneck hitch.

Another object of the present invention is to provide a hitch assembly that allows users to easily remove and invert the gooseneck hitch.

These and other objects of the present invention will become apparent to those skilled in the art upon reference to the following specification, drawings, and claims.

The present invention intends to overcome the difficulties encountered heretofore. To that end, a gooseneck hitch is provided. The hitch assembly includes a channel for receiving a hitch ball head assembly. The channel is covered by and coupled to a locking collar which rotates to open access to the channel. Once the hitch ball head assembly is inserted into the channel, the collar is released and resilient members guide the collar to its resting position thereby locking the hitch ball head assembly in place. Alternatively, the collar is released and resilient members guide a lever to its resting position within a circumscribed groove of the hitch ball head assembly, thereby locking the hitch ball head assembly in place. The hitch ball head assembly can be selectively removed from or inverted in the channel when towing is not necessary in order to free the surface of the towing vehicle from unwanted and unsightly obstructions. Optionally, the hitch assembly may be protected or covered by a housing.

BRIEF DESCRIPTION OF THE DRAWINGS

The features and advantages of the invention are explained in more detail in the subsequent detailed description with reference to the embodiments illustrated in the attached drawing figures, in which like reference numerals denote like elements and in which FIGS. 1-19 illustrate some embodiments of the present invention.

FIG. 1 is a perspective view of the gooseneck hitch of one embodiment of the present invention deployed in a towing position.

FIG. 2 is a perspective view of the gooseneck hitch of one embodiment of the present invention.

FIG. 3 is a top view of the gooseneck hitch of one embodiment of the present invention in a towing position.

FIG. 4 is a top view of the gooseneck hitch of one embodiment of the present invention in an inverted position.

FIG. 5 is a top view of the retaining assembly of one embodiment of the present invention.

FIGS. 6(a)-6(c) are top views of the retaining assembly of one embodiment of the present invention.

FIGS. 7(a)-7(d) are top views of the retaining assembly of one embodiment of the present invention.

FIG. 8 is a bottom view of the gooseneck hitch assembly wherein the hitch ball head assembly is positioned in an inverted position in one embodiment of the present invention.

FIG. 9 is a bottom view of gooseneck hitch assembly of one embodiment of the present invention with the hitch ball head assembly removed.

FIG. 10 is a bottom view of the gooseneck hitch assembly of one embodiment of the present invention with the hitch ball head assembly removed.

FIG. 11 is a perspective view of the gooseneck hitch assembly in an alternate embodiment of the present invention.

FIG. 12 is a front view of one embodiment of the hitch ball head assembly of the present invention.

FIG. 13 is a perspective view of the gooseneck hitch assembly in an alternate embodiment of the present invention with the hitch ball head assembly removed.

FIGS. 14(a)-14(b) are perspective views of the insertion of the hitch ball head assembly into the gooseneck hitch assembly of one embodiment of the present invention.

FIG. 15 is a top view of the gooseneck hitch assembly of one embodiment of the present invention wherein the hitch ball head assembly is in an inverted position.

FIGS. 16(a)-16(d) are views of the gooseneck hitch assembly in one embodiment of the invention.

FIG. 17 is a bottom perspective view of the gooseneck hitch assembly in one embodiment of the invention wherein the hitch ball head assembly is positioned in an inverted position.

FIGS. 18(a)-18(d) are views of the gooseneck hitch assembly in another embodiment of the invention.

FIG. 19 is a perspective view of the gooseneck hitch assembly and an embodiment of a protective housing of the present invention wherein the hitch ball head assembly is positioned in an inverted position.

DETAILED DESCRIPTION OF THE INVENTION

Figure 1:
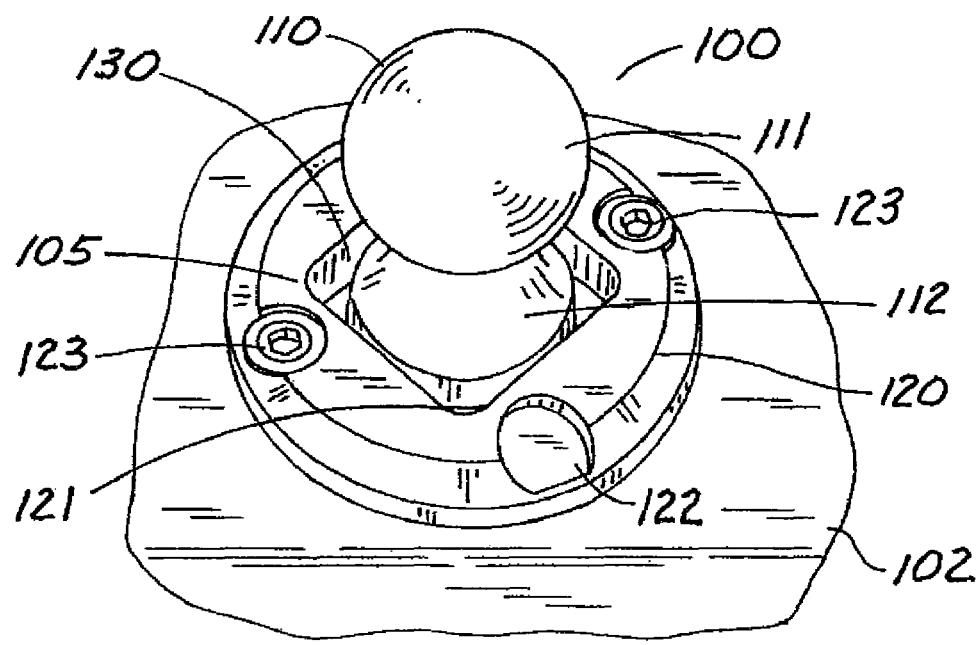

Referring now to the drawings in more detail, FIGS. 1-10 and 20-21 depict one embodiment of the gooseneck hitch assembly. FIGS. 11-19 and 22 depict various iterations of an alternative embodiment of the gooseneck hitch assembly of the present invention. However, it is to be understood that the disclosed embodiments are merely exemplary of the present invention which may be embodied in various forms. Therefore, specific structural, functional, or other details disclosed herein are not to be interpreted as limiting, but merely as a representative basis for teaching one skilled in the art to employ the present invention in numerous appropriate ways.

FIGS. 1-10 depict one possible embodiment of a gooseneck hitch assembly 100. As seen generally in FIGS. 1-10, the gooseneck hitch assembly 100 includes at least a hitch head assembly 110 and a retaining assembly 105 which consists in part of a lock collar 120 and a receiving channel 130. The retaining assembly 105 is mounted to the bed surface of a towing vehicle and is adapted to selectively receive the removable hitch head assembly 110 in a plurality of positions, including at least a towing position (e.g., FIG. 3) and an inverted position(e.g., FIG. 4) to allow for minimal obstruction to the bed of the towing vehicle.

Figure 2:
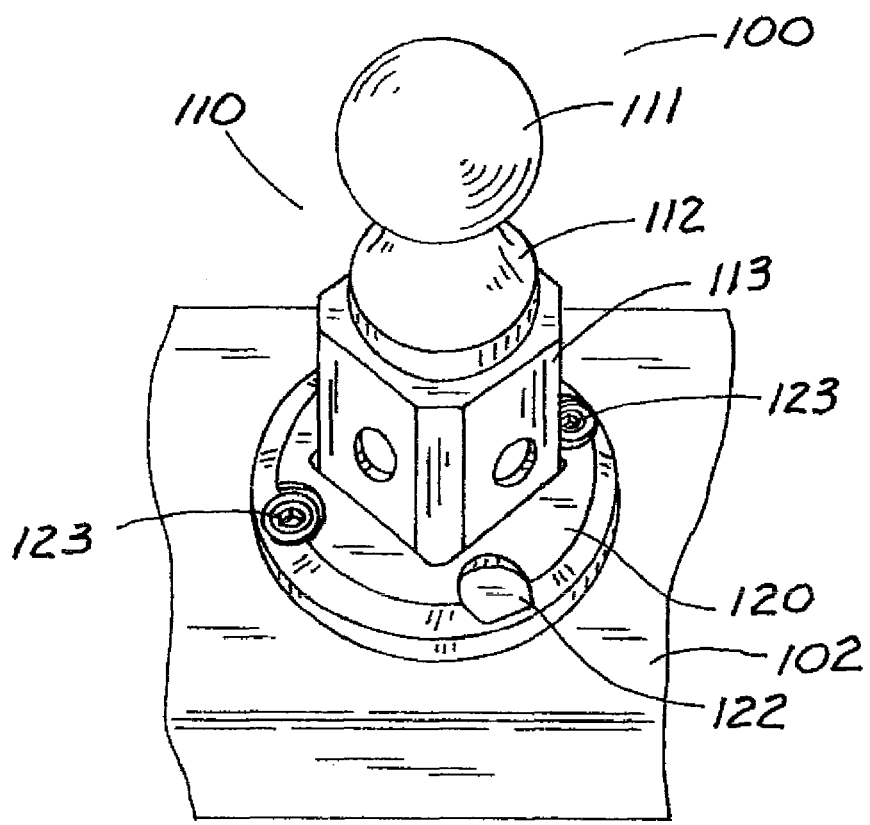

The hitch head assembly 110 is generally depicted in FIG. 2. The hitch head assembly 110 may comprise a ball element 111 for providing a surface to be attached to the hitch ball coupler of the towed trailer or towed vehicle as known in the art. The ball element 111 is of a shape well-known in the art and is of standardized dimensions that are determined by the size of the hitch ball coupler on the towed trailer that is to receive the ball element 111 during use. For example, the ball element 111 may have a substantially spherical configuration, but it is appreciated that the ball element 111 may have other shapes and configurations within the scope of the present invention.

In some embodiments, the hitch head assembly 110 may also include a neck element 112 attached to the ball element 111. The neck element 112 may have a curved conical configuration having a larger dimension at the bottom portion of the neck element 112. However, it is appreciated that the neck element 112 may have other shapes and configurations within the scope of the present invention.

The hitch head assembly 110 may also have a base portion 113 for being received in the receiving channel 130 during use. The base portion 113 may generally be adapted to be the same profile as the receiving channel 130 to allow the base portion 113 to be securely received by the receiving channel 130. However, it is appreciated by one skilled in the art that there may be many configurations, shapes, and alterations of the base portion 113 within the scope of the present invention.

Figure 3:
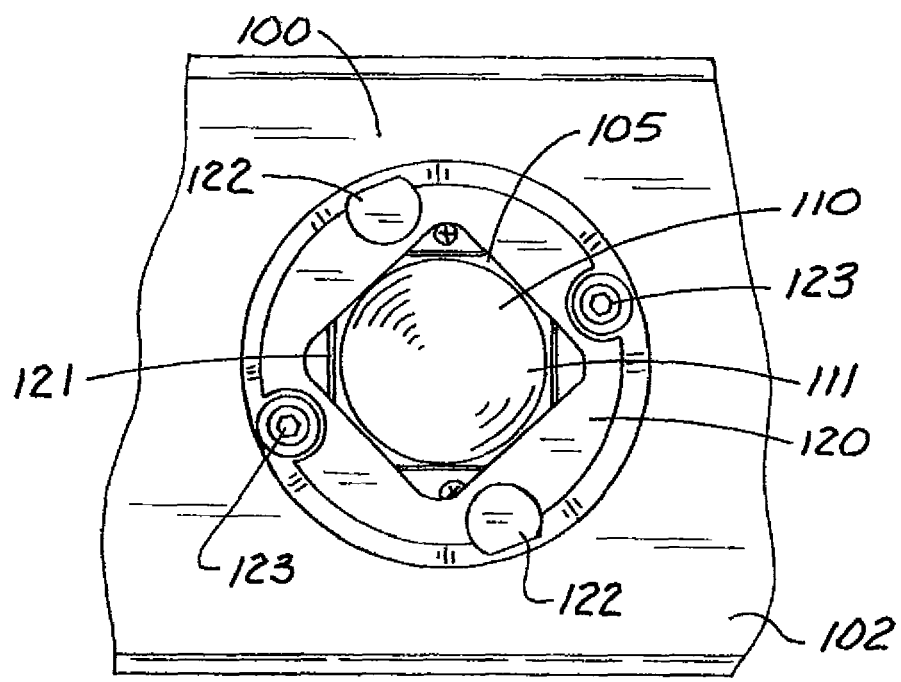
Figure 4:
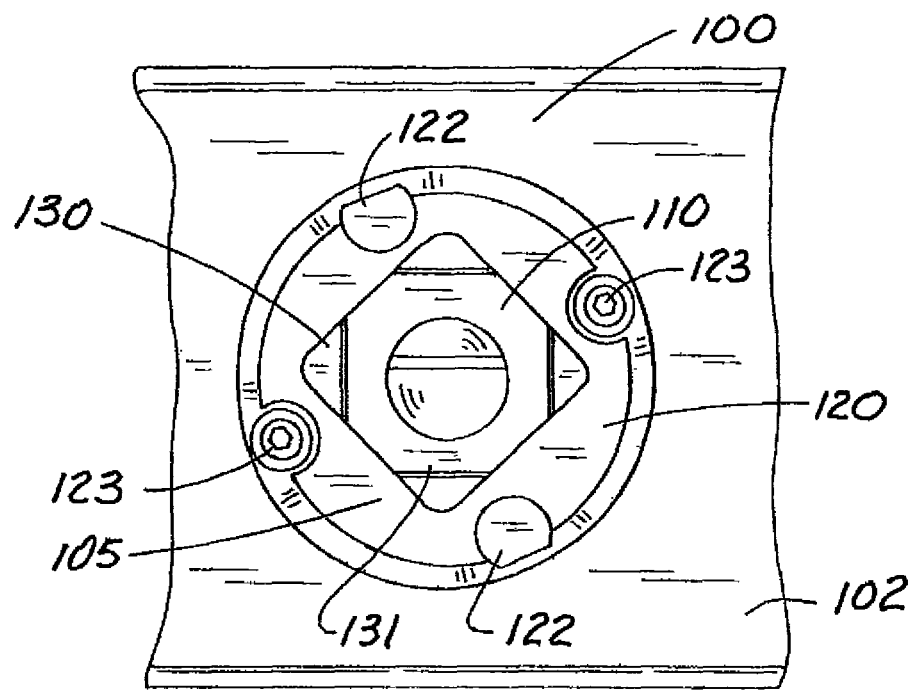

FIG. 3 and FIG. 4 show the hitch head assembly 110 set and locked in the retaining assembly 105 of the gooseneck hitch assembly 100 in a plurality of positions. FIG. 3 shows the hitch head assembly 110 deployed upright in a towing position with the ball element 111 extending above the lock collar 120. Conversely, FIG. 4 shows the hitch head assembly 110 in an inverted position with the ball element 111 extending through the receiving channel 130 away from the lock collar 120 and with the base element 113 of the hitch head assembly 110 remaining near the lock collar 120. The inverted position allows, for example, the surface of a cargo bed in a towing vehicle to remain free of obstacles when the gooseneck hitch assembly 100 is not in use.

FIG. 5 generally shows the retaining assembly 105 which includes at least a lock collar 120 and a receiving channel 130. The lock collar 120 may include in some embodiments at least one bolt 123 extending through the lock collar 120 and the receiving channel 130 to secure the lock collar 120 to the gooseneck hitch assembly 100. For example, the embodiment in FIG. 5 includes two bolts 123. However, in the spirit of the present invention, the lock collar 120 may receive more or less bolts 123, and it is appreciated that other types of attachment means may secure the lock collar 120 to the hitch assembly 100. For example, a lug, pin, or other coupler may be used in place of bolts, and several other attachment means are possible.

The lock collar 120 may also include at least one cavity 122. The cavity 122 may be used, for example, as a finger grip for the user when rotating the lock collar 120. It should be appreciated that the configuration, number, and geometry of the cavity 122 may vary from those shown in FIG. 5 within the scope of the present invention. For example, FIG. 5 depicts two cavities 122 for the user to grasp with his fingers when manipulating the lock collar 120. However, more or less cavities 122 may exist.

FIGS. 6(a)-6(c) and FIGS. 7(a)-7(d) generally depict the rotation of the lock collar 120 with respect to the receiving channel 130 and show the lock collar 120 in a locked (e.g., FIG. 6(c)) and unlocked position (e.g. FIG. 6(b)). FIG. 6(a) shows the lock collar 120 in its resting locked position, wherein the opening 121 of the lock collar 120 is rotated at an angle 125 from the opening 131 of receiving channel 130. The angle of offset 125 may be 45 degrees, but it is appreciated that the angle 125 may be greater or lesser than 45 degrees within the scope of the present invention. To unlock the retaining assembly 105, the user rotates the lock collar 120 from the locked position in FIG. 6(a) to the unlocked position in FIG. 6(b) using, for example, the cavities 122, until the opening 121 of the lock collar 120 and the opening 131 of the receiving channel 130 align as in FIG. 6(b). To re-lock the lock collar 120, the user then releases the lock collar 120, or the cavities 122, allowing the lock collar 120 to spring back to its initial locked position as in FIG. 6(c) using the springs 135 in FIGS. 8-10.

Figure 10:
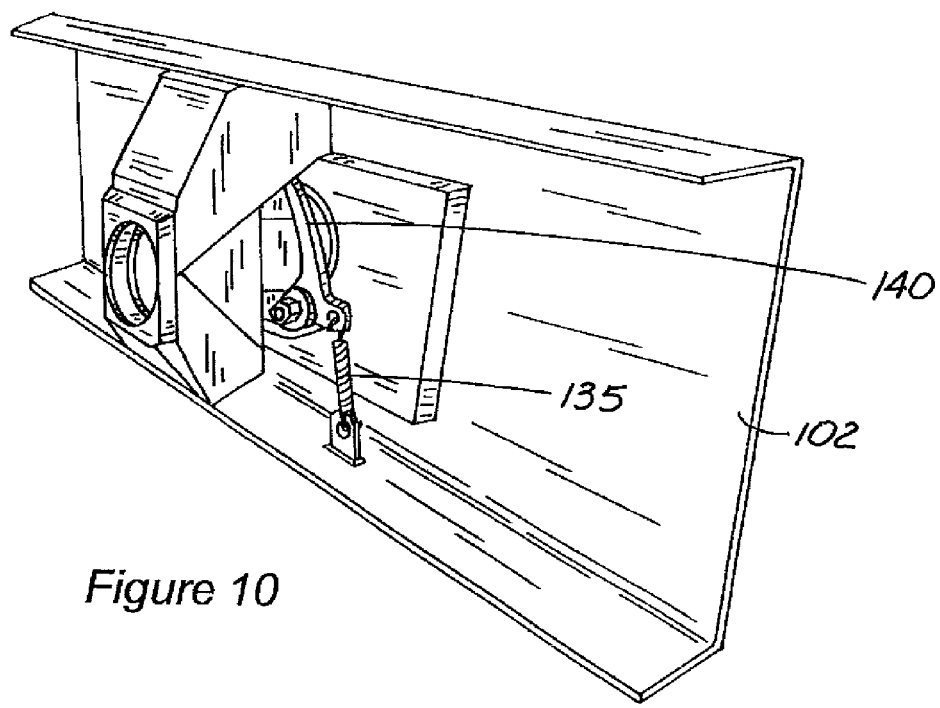
Figure 11:
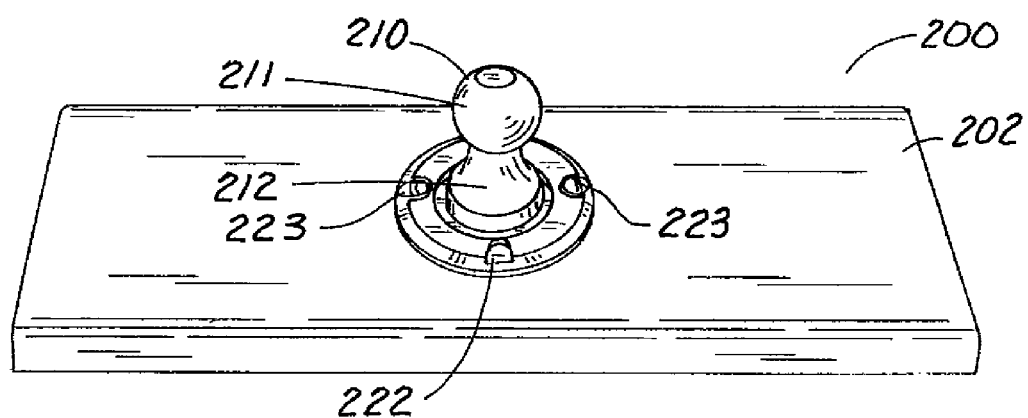

FIGS. 8-10 show possible additional elements of the retaining assembly 105. For example, the retaining assembly also may include at least one spring 135 to connect the surface 102 to the lock collar 120 for guiding the lock collar 120 back to a resting position. The embodiment in FIGS. 8-10 includes, for example, two springs 135 connected to the surface 102 and to an optional ring 140 to bias the lock collar 120 back to its locked position. The ring 140 is coupled to the lock collar 120 with and is configured to receive, for example, two bolts 123. The ring 140 may be circular, but may also be a variety of other geometries and configurations within the present invention. The ring 140 helps increase surface area and increase the resistance of the lock collar 120 to an upward vertical load.

As depicted in FIGS. 1-10, the hitch head assembly 110 may be inserted into the retaining assembly 105 in a plurality of orientations, including at least a towing or an inverted position. The hitch head assembly 110 is thus both selectively removable and invertible in the retaining assembly 105 to present a low profile within the towing vehicle bed when the hitch head assembly 110 is not needed or in use.

As illustrated in FIGS. 1-3, to engage the hitch head assembly 110 in an upright towing position in the retaining assembly 105, the base element 113 of the hitch head assembly 110 is inserted into the receiving channel 130 before the ball element 111 portion of the hitch head assembly 110. The user must first twist the lock collar 120 until the opening 121 of the lock collar 120 aligns with the opening 131 of the receiving channel 130. Once the base element 113 of the hitch head assembly 110 is inserted and seated in the receiving channel 130, the lock collar 120 is released and springs 135 twist the lock collar 120 back to its locked resting position so that the opening 121 of the locking collar 120 no longer aligns with the opening 131 of the receiving channel 130.

FIGS. 4 and 8 show that the hitch head assembly 110 may also be secured within the gooseneck hitch assembly 100 in an inverted position to provide an unobstructed surface in the towing vehicle when hitch assembly 100 is not in use. To engage the hitch head assembly 110 in an inverted storage position, the ball element 111 of the hitch head assembly 110 is inserted into the receiving channel 130 before the base element 113 portion of the hitch head assembly 110. The user begins by twisting the lock collar 120 until the opening 121 of the lock collar 120 aligns with the opening 131 of the receiving channel 130. Once the ball element 113 of the hitch head assembly 110 is inserted through the receiving channel 130 and the hitch head assembly 110 is seated in the receiving channel 130, the lock collar 120 is released and springs 135 bias the lock collar 120 back to its locked resting position so that the opening 121 of the lock collar 120 no longer aligns with the opening 131 of the receiving channel 130.

An alternative embodiment of the gooseneck hitch assembly 200 of the present invention is shown with various possible iterations in FIGS. 11-19. As seen generally in FIGS. 11-19, the gooseneck hitch assembly 200 generally includes at least a hitch head assembly 210 and a retaining assembly 205 which consists in part of at least a lock collar 220, a receiving channel 230, and a pivoting lever 235. The retaining assembly 205 is mounted to the surface of the bed of a towing vehicle and is adapted so that the hitch head assembly 210 may be selectively removed and engaged in a plurality of positions including at least a towing position (e.g., FIG. 11) and an inverted position (e.g. FIG. 15) to allow for minimal obstruction to the bed of the towing vehicle.

Figure 12:
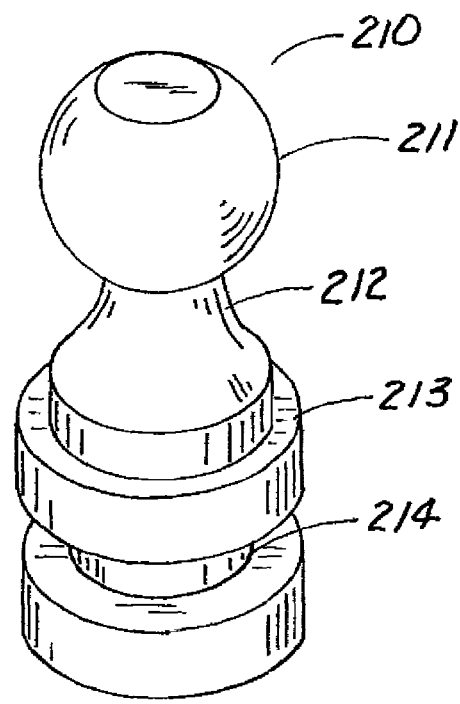

The hitch head assembly 210 of this alternative embodiment is generally depicted in FIG. 12. The hitch head assembly 210 may comprise a ball element 211 for providing a surface to be attached to the trailer's hitch ball coupler as known in the art. The ball element 211 is of a shape well known in the art and is of standardized dimensions that are determined by the size of the hitch ball coupler on the towed trailer that is to receive the ball element 211 during use. The ball element 211 may have a substantially spherical configuration, but it is appreciated that the ball element 211 may have other shapes and configurations within the scope of the present invention.

In some embodiments, the hitch head assembly 210 may also include a neck element 212 attached to the ball element 211. The neck element 212 may have a curved conical configuration having a larger dimension at the bottom portion of the neck element 212. However, it is appreciated that the neck element 112 may have other shapes and configurations within the scope of the present invention.

The hitch head assembly 210 may also comprise a base portion 213 for being received in the receiving channel 230. The base portion 213 may generally be adapted to be the same profile as the opening 231 of the receiving channel 230 to allow the base portion 213 to securely align with the receiving channel 230. However, it is appreciated that there may be many configurations, shapes, and alterations of the base portion 213 and opening 231 within the scope of the present invention.

As shown in FIG. 12, the hitch head assembly 210 may also include at least one groove 214. This groove 214 may, for example, be circumscribed in the base element 213 of the hitch head assembly 210. There may also be multiple concentric grooves 214. The profile of the groove 214 may be circular. However, it is appreciated that the groove 214 may have other shapes and configurations within the scope of the present invention.

Figure 13:
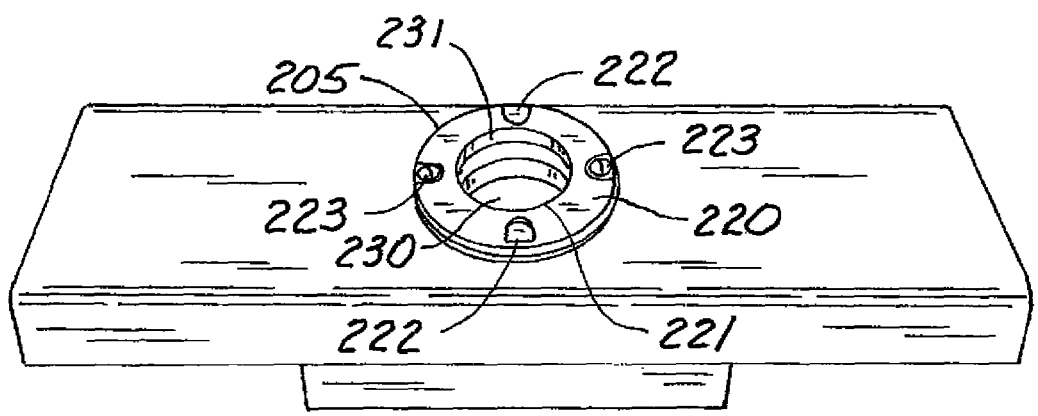
Figure 20:
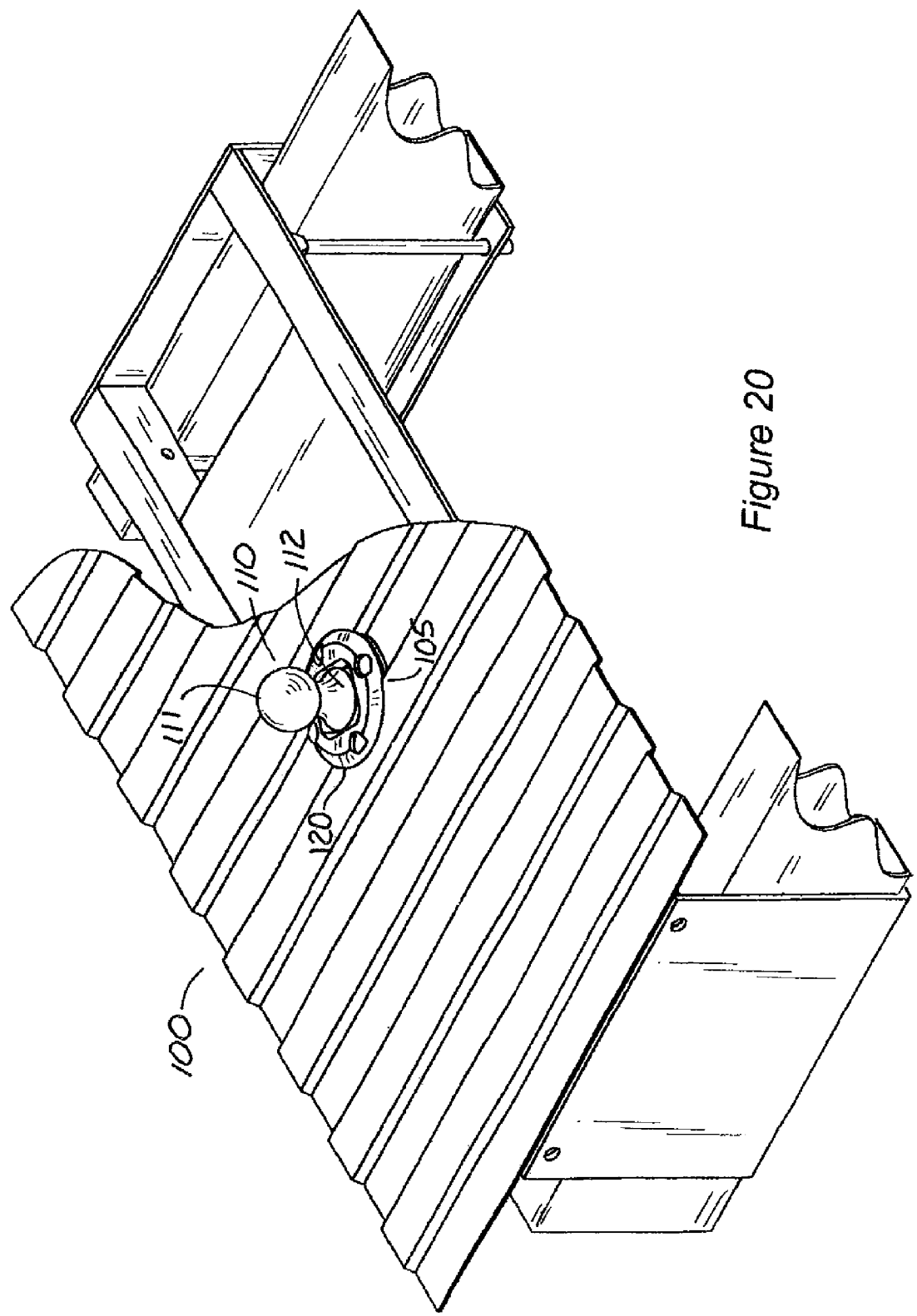
FIG. 20 is a perspective view of the gooseneck hitch assembly of the present invention.
Figure 21:
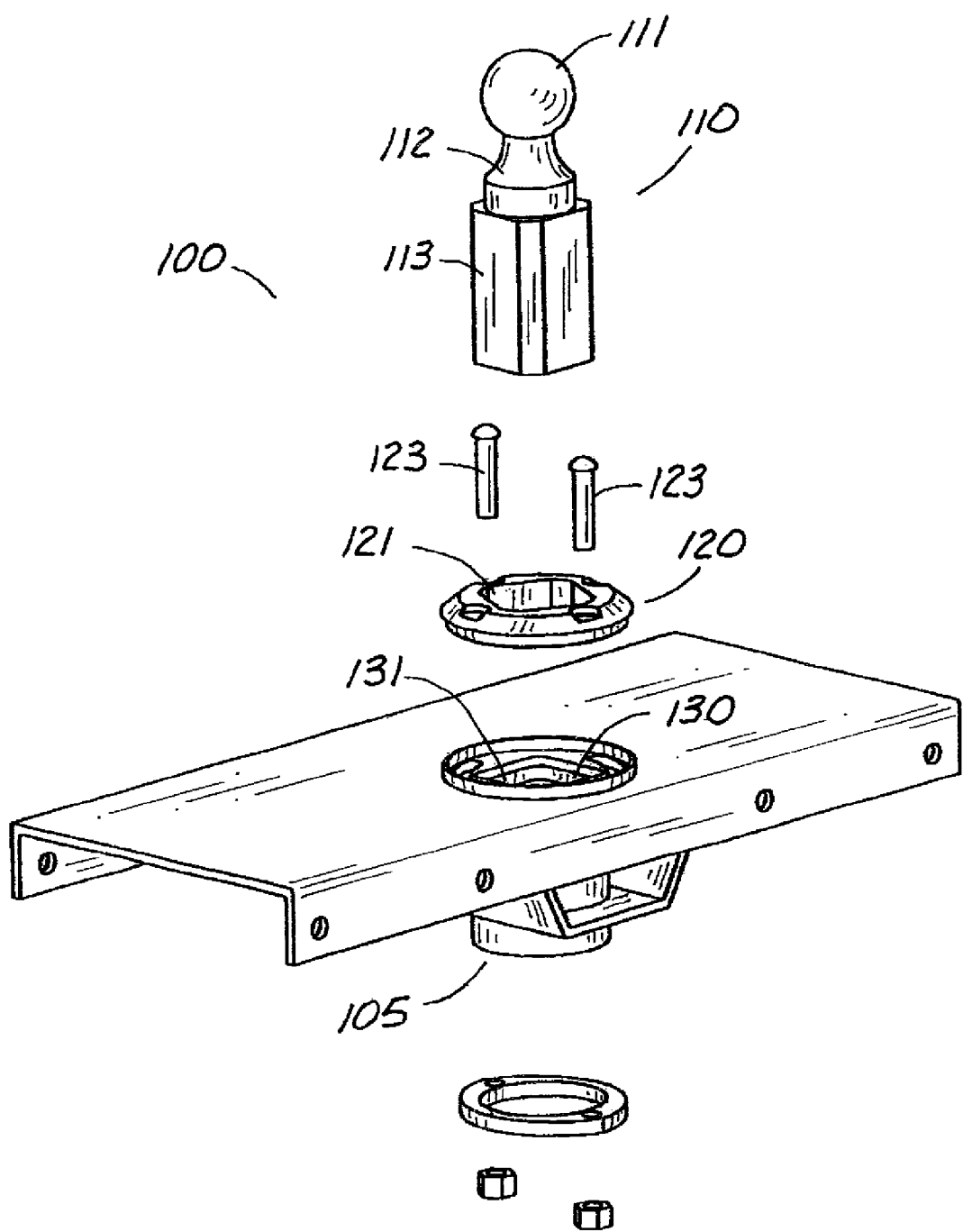
FIG. 21 is an exploded view of an embodiment of the gooseneck hitch assembly of the present invention.
Figure 22:
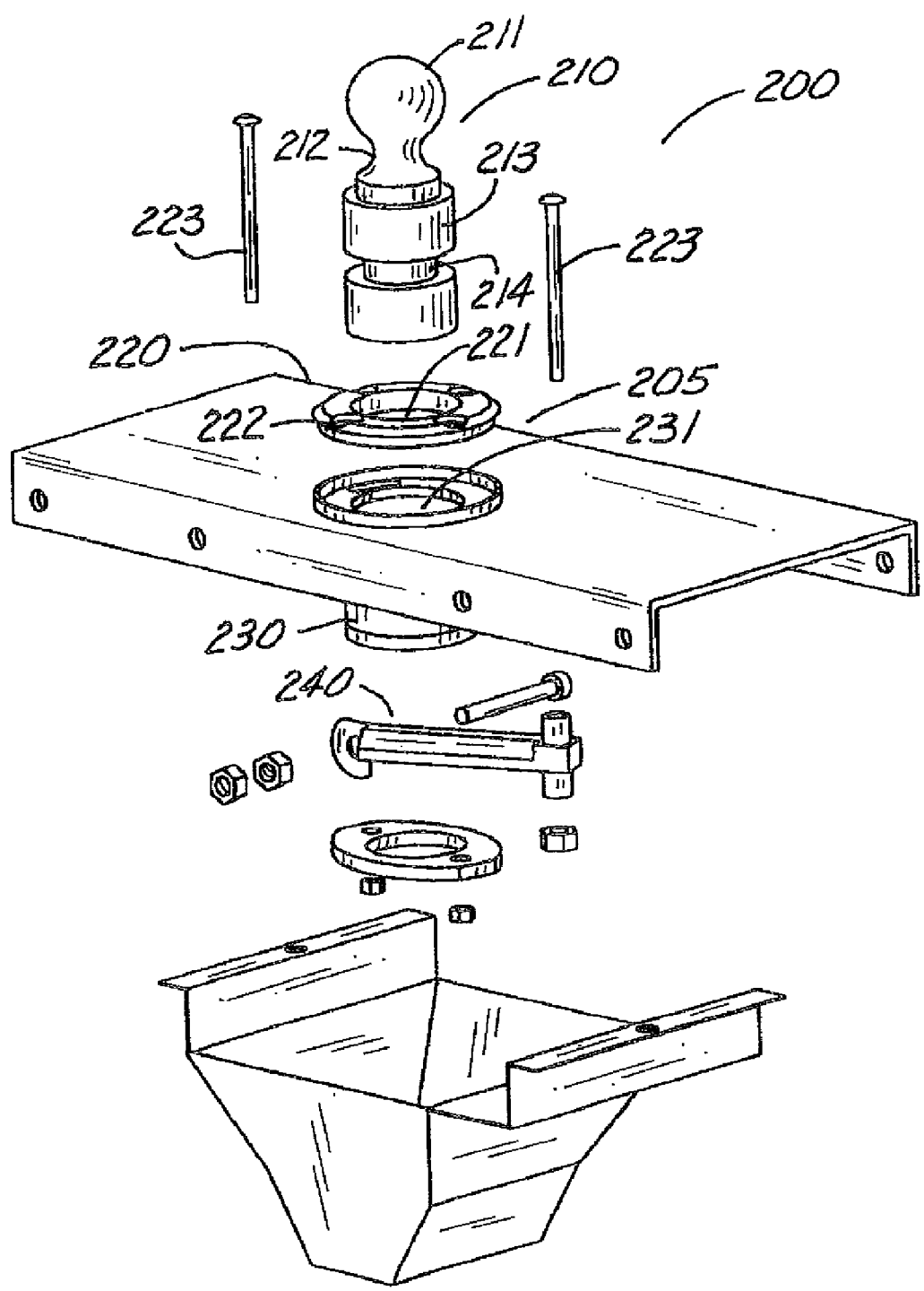
FIG. 22 is an exploded view of an embodiment of the gooseneck hitch assembly of the present invention.

FIG. 13 generally shows the retaining assembly 205 which includes at least a lock collar 220 and a receiving channel 230. The lock collar 220 is coupled to the receiving channel 230. The lock collar 220 may include in some embodiments at least one bolt 223 extending through the lock collar 220 and a slot 232 in, for example, the receiving channel 230 to secure the lock collar 220 in place. The embodiment in FIG. 3, for example, includes two bolts 223 extending through the lock collar 220 and the receiving channel 230. However, in the spirit of the present invention, the lock collar 220 may receive more or less bolts 223, and other types of attachment means may secure the lock collar 220 to the hitch assembly 200. For example, a lug or pin may be used in place of the bolts, and other types of attachment means are possible within the scope of the invention.

The lock collar 220 may also include at least one cavity 222. The cavity 222 may be used, for example, as finger grips for the user. The embodiment in FIGS. 13-15 includes two chamfered cavities 222, but it is appreciated that more or less cavities 222 may be utilized within the present invention. Cavities 222 may also receive bolts 223 or other attachment means as necessary. It should also be appreciated that the configuration and geometry of the cavity 222 may vary from those shown in FIG. 13 within the scope of the present invention.

The lock collar 220 also has an opening 221 for receiving hitch head assembly 210. The opening 221 may have a circular profile and may have a profile similar to the profile of the base element 213 of the hitch head assembly 210. However, it will be apparent to those skilled in the art that the opening 221 may have other shapes and configurations within the scope of the present invention FIGS. 14(a)-14(b) show the insertion of the hitch head assembly 210 into the retaining assembly 205. The user grasps the hitch head assembly 210 and pushes it through the lock collar 220 into the receiving channel 230 until the hitch head assembly 210 is securely seated. The hitch head assembly 210 may be selectively inserted in a plurality of positions as shown by FIGS. 14-15. For example, FIGS. 14(a)-14(b) show the hitch head assembly 210 deployed in a towing position with the base element 213 inserted into the retaining assembly 205 before the ball element 211. Conversely, FIG. 15 depicts an alternative inverted position whereby the ball element 211 is inserted into the receiving channel 230 before the base element 213. The inverted position may be helpful when the hitch assembly 200 is not in use as it eliminates obstruction to the surface of the towing bed.

FIGS. 16(a)-16(d) and FIG. 17 illustrate one embodiment of the retaining assembly 205. To operate, the user may twist the lock collar 220 by using the cavities 222 or by simply pushing the hitch head assembly 210 into the lock collar 220. The rotation of the lock collar 220 causes bolts 223 to slide in the slot 232. Consequently, at least one bolt 223 engages the lever 240 inside the receiving channel 230 to urge the lever 240 away from the receiving channel 230 around a pivot point 241. This fully opens the receiving channel 230. Once the hitch head assembly 210 is inserted into the receiving channel 230 and the lock collar 220 is released, springs 235 bias the lever 240 back toward the retaining channel 230. As a result, the lever 240 comes to rest within the groove 214 of the base element 213 of the hitch head assembly 210 fully locking the hitch head assembly 210 in the retaining assembly 205.

In this embodiment, springs 235 may be attached at one end to the surface 202 or a frame attached to surface 202, and attached at the opposite end to the lever 240. Additionally, as shown in FIG. 17, there may be a plurality of springs 235 such that at least one spring 235 attaches at the pivot point 241 of the lever 240 and at least one spring 235 attaches at another point on the lever 240. Again, several additional spring configurations and various numbers of springs are possible within the scope of the present invention.

Additionally, the embodiment in FIG. 17 includes an optional ring 245 which receives the bolts 223 thereby coupling the ring 245 to the lock collar 220. Additionally, the ring 245 may be configured to receive springs 235. The ring 245 may also be engaged with the receiving channel 230. The ring 245 may be circular, but may also be a variety of other geometries and configurations within the scope of the present invention. The ring 245 helps increase surface area and increase the resistance of the lock collar 220 to an upward vertical load.

To insert the hitch head assembly 210 in a towing position, the user rotates the lock collar 220 which causes the bolts 223 to slide in slots 232. At least one bolt 223 engages with the lever 240 to urge the lever 240 away from the receiving channel 230 around the pivot point 241. After the base element 213 is inserted and seated into the receiving channel 230, the user releases the lock collar 220. Consequently, at least one spring 235 biases the lever 240 back toward the receiving channel 230 until it ultimately comes to rest in a locked position within the groove 214 of the base element 213 of the hitch head assembly 210.

Similarly, to remove the hitch head assembly 210 from the retaining assembly 205, the user will rotate the lock collar 220 to bias the lever 240 out of the groove 214 and away from the receiving channel 230 to unlock the hitch head assembly 210. Once the user removes the hitch head assembly 210 from the receiving channel 230 and releases the lock collar 220, at least one spring 235 biases the lever 240 back toward the receiving channel 230 to its resting position inside the receiving channel 230 as in FIGS. 16(a)-16(b).

As depicted in FIGS. 15, 17, and 19, the hitch head assembly 210 may also be inverted within the hitch assembly 200 to provide an unobstructed surface 202 in the towing vehicle when hitch assembly 200 is not in use. To engage the hitch head assembly 210 in an inverted storage position in the retaining assembly 205, the ball element 213 of the hitch head assembly 210 is inserted into the receiving channel 230 before the base element 213 by twisting the lock collar 220. This rotation causes at least one bolt 223 to engage with the lever 240 to urge the lever 240 away from the receiving channel 230. Once the base element 213 of the hitch head assembly 210 is inserted through the receiving channel 230 such that the hitch head assembly 210 is seated in the receiving channel 230, the lock collar 220 is released and a spring 235 biases the lever 240 back to its resting position within the groove 214 of the base element 213 of the hitch head assembly 210 thereby securing the hitch head assembly 210 within the hitch assembly 200.

There are also several additional ways to connect the lever 235 to the lock collar 220. For example, instead of the lever 240, FIGS. 18(a)-189(d) depict an alternate embodiment of the lever 340 of the present invention wherein the lever 340 contains a slot 342 to receive a bolt 223 at the pivot point 341 of the lever 340. To operate, the user may twist the lock collar 220 by using the cavities 222, thereby causing at least one bolt 223 to slide in slot 232 of, for example, the receiving channel 230 or the surface 202. Simultaneously, at least one bolt, pin, or other member 223 slides within slot 342 of lever 340 to urge lever 340 away from the receiving channel 230 around pivot point 341. This fully opens receiving channel 230. Once the hitch head assembly 210 is inserted into the receiving channel 230 and the lock collar 220 is released, at least one spring 335 biases the lever 340 back toward the retaining channel 130. As a result, the lever 340 comes to rest within the groove 214 of the base element 213 of the hitch head assembly 210 fully securing the hitch head assembly 210 in the retaining assembly 205.

In this embodiment, at least one spring 335 may be attached at one end to the surface 202, or a frame attached to the surface 202, and attached at a second end to the pivot point 341 of the lever 340. The spring 335 helps bias the lever 340 back to its locked position. As one skilled in the art will recognize, additional springs 335 may be used.

In any of the above embodiments, the hitch assembly 100 and the hitch assembly 200 may also include a protective housing 250 as depicted in FIG. 19. The housing 250 may, for example, help prevent dirt, debris, or other items from damaging or entering the hitch assembly 100 or 200. The housing 250 may be removably or permanently attached to the hitch assembly 100 or 200 or alternatively to the frame surface 102 or 202 by way of pins 254 or other attachment means within the scope of the present invention. As shown in FIG. 19, in one embodiment the housing may include a plurality of sidewalls 251 and a face 252. The face may include an orifice 253 to receive the ball element 111 or 211 of the inverted hitch head assembly 110 or 210. However, a person skilled in the art will appreciate that within the scope of the present invention the housing 250 may take on other forms, shapes, and configurations than the one embodiment of the housing 250 depicted in FIG. 19. For example, while the housing 250 illustrated in FIG. 19 has an orifice 253, the plurality of sidewalls 251 may also be extended downwardly to permit the housing 250 to fully enclose the hitch head assembly 111 or 211. A person skilled in the art will recognize that other housing 250 configurations and attachment methods are possible within the scope of the present invention. Additionally, a person skilled in the art will recognize that the housing may be adapted to any of the embodiments discussed in this description and depicted in FIGS. 1-19 as well as other potential embodiments of the present invention.

Also, one of skill in the art will recognize that the hitch head assembly 110 does not have to be invertible to be within the scope of the present invention.

Figure 23:
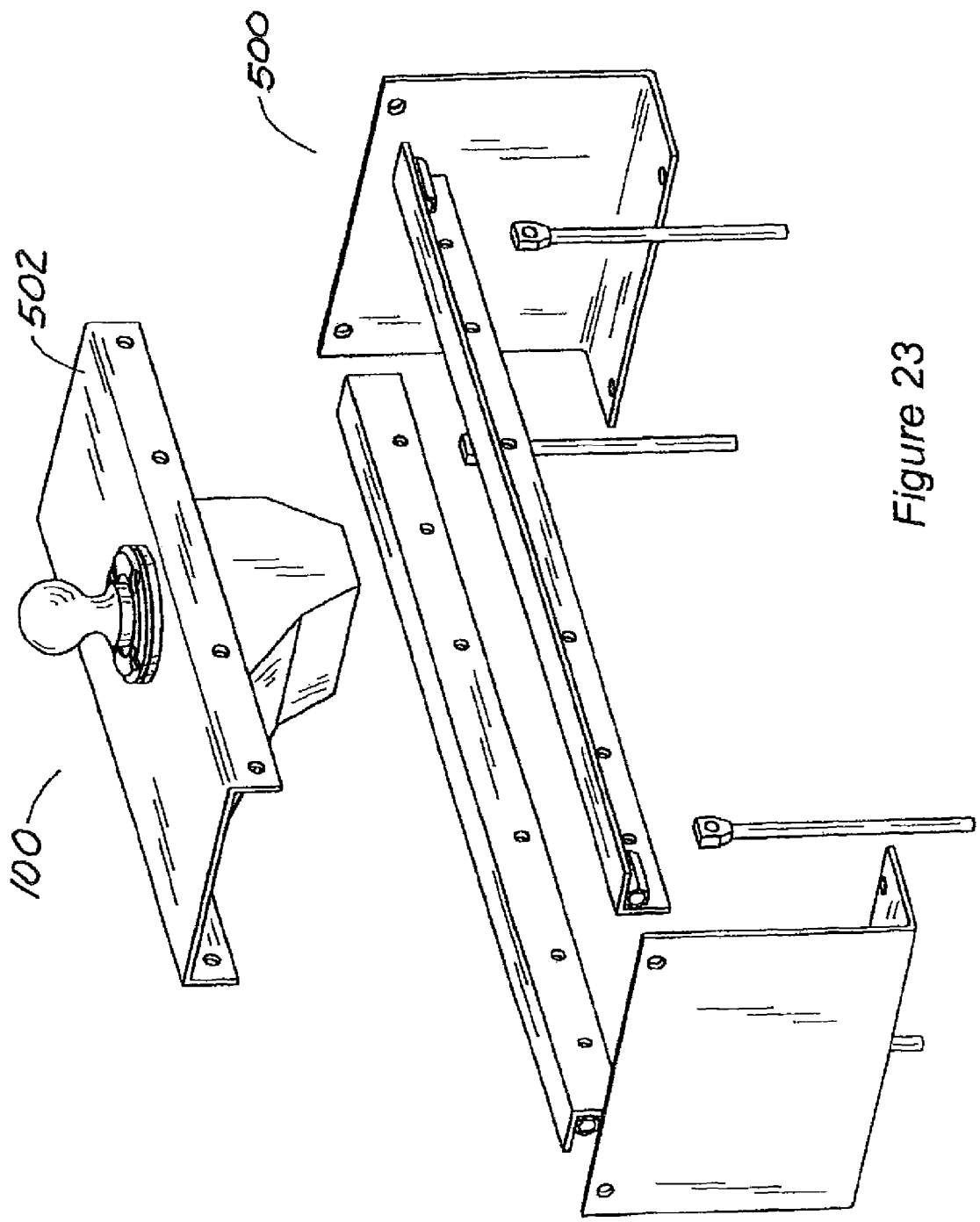
FIG. 23 is an exploded view of a rail attachment means of the gooseneck hitch assembly of the present invention.

FIG. 23 shows one system for attaching the hitch 100 of the present invention to the bed of the truck. The rail assembly system 500 shown in FIG. 23 is only one system for attaching the hitch 100 of the present invention to the truck and the invention is not limited to this particular means for attachment. The rail assembly system 500 includes a center plate 502 that the retaining assembly 105 attaches to.

The foregoing description and drawings comprise illustrative embodiments of the present invention. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have this disclosure before them will be able to make modifications and variations therein without departing from the scope of the invention.

The invention claimed is:

1. A gooseneck hitch assembly for pulling a trailer behind a towing vehicle, comprising:
    a) a hitch head assembly; and
    b) a retaining assembly configured to selectively receive and secure the hitch head assembly, wherein the hitch head assembly is separable from the retaining assembly, the retaining assembly comprising:
        i) a channel, the channel adapted to selectively receive and secure the hitch head assembly; and
        ii) a rotatable locking collar coupled to the channel at the receiving end of the channel.

2. The gooseneck hitch assembly of claim 1, wherein the locking collar rotates from a first position to a second position, wherein the rotation of the locking collar to the first position prevents removal of the hitch head assembly, and wherein the rotation of the locking collar to a second position allows removal of the hitch head assembly.

3. The gooseneck hitch assembly of claim 1 wherein the hitch head assembly further comprises:
    a) a base portion;
    b) a neck portion connected to the base portion; and
    c) a ball portion connected to the neck portion.

4. The gooseneck hitch assembly of claim 3 wherein the retaining assembly receives and secures the hitch head assembly in a plurality of orientations, including:
  a) a deployed orientation, wherein the hitch head assembly is inserted into the retaining assembly with the ball portion of the hitch head assembly extending above the locking collar; and
  b) an inverted orientation, wherein the hitch head assembly is inserted into the retaining assembly with the ball portion of the hitch head assembly positioned beneath the locking collar and through the channel.

5. The gooseneck hitch assembly of claim 1 further comprising at least one resilient member coupled to the locking collar and the towing vehicle.

6. The gooseneck hitch assembly of claim 5 wherein the resilient member comprises a spring.

7. The gooseneck hitch assembly of claim 1 further comprising:
  a) a ring attached to the locking collar by an attachment means, wherein the surface of the towing vehicle is positioned between the ring and the locking collar; and
  b) at least one resilient member coupled to the ring and the towing vehicle.

8. The gooseneck hitch assembly of claim 7 wherein the attachment means comprises at least one bolt.

9. The gooseneck hitch assembly of claim 7 wherein the resilient member comprises a spring.

10. The gooseneck hitch assembly of claim 1 further comprising:
  a) a ring attached to the locking collar, wherein the locking collar is coupled to the channel at a first end of the channel and the ring is engaged with the channel at a second end of the channel; and
  a resilient member having a first end and a second end, wherein the ring receives the first end of the resilient member, and wherein the second end of the resilient member is attached to the towing vehicle.

11. The gooseneck hitch assembly of claim 10 wherein the attachment means comprises at least one bolt.

12. The gooseneck hitch assembly of claim 10 wherein the resilient member comprises a spring.

13. The gooseneck hitch assembly of claim 1 further comprising a protective housing wherein the protective housing at least partially covers the hitch head assembly.

14. The gooseneck hitch assembly of claim 1 wherein the locking collar further comprises at least one aperture in the locking collar wherein the aperture is adapted to receive an attachment means.

15. The gooseneck hitch assembly of claim 14 wherein the attachment means comprises at least one bolt.

16. The gooseneck hitch assembly of claim 1 wherein the locking collar further comprises at least one aperture wherein the aperture is adapted to aid in the rotation of the locking collar.

17. A gooseneck hitch assembly for pulling a trailer behind a towing vehicle, comprising:
  a) a hitch head assembly adapted to releasably hitch to the trailer; and
  b) a retaining assembly configured to selectively receive and secure the hitch head assembly in a plurality of orientations, wherein the hitch head assembly is separable from the retaining assembly and is selectively invertible with respect to the retaining assembly, and wherein the retaining assembly is engaged with a surface of the towing vehicle, the retaining assembly comprising:
    i) a channel, the channel adapted to removably and selectively receive and secure the hitch head assembly in a plurality of orientations;
    ii) a locking collar coupled to the channel, the locking collar configured to rotate from a first position to a second position, wherein rotation of the locking collar to the first position prevents removal of the hitch head assembly, and wherein rotation of the locking collar to the second position allows removal of the hitch head assembly; and
    iii) at least one resilient member coupled to the locking collar and the towing vehicle, wherein the resilient member biases the locking collar when the locking collar is rotated.

18. The gooseneck hitch assembly of claim 17 wherein the hitch head assembly further comprises:
  a) a base portion;
  b) a neck portion connected to the base portion; and
  c) a ball portion connected to the neck portion.

19. The gooseneck hitch assembly of claim 17 wherein the plurality of orientations comprises at least:
  a) a deployed orientation, wherein the hitch head assembly is inserted into the retaining assembly with the ball portion of the hitch head assembly extending above the locking collar; and
  b) an inverted orientation, wherein the hitch head assembly is inserted into the retaining assembly with the ball portion of the hitch head assembly positioned beneath the locking collar and through the channel.

20. A method for attaching a hitch head assembly to a towing vehicle, the method comprising the steps of:
  a) providing a towing vehicle having a retaining assembly configured to selectively and removably receive and secure a hitch head assembly, the retaining assembly comprising:
    i) a channel, the channel adapted to removably and selectively receive and secure the hitch head assembly; and
    ii) a locking collar coupled to the channel, the locking collar configured to rotate from a first position to a second position, wherein rotation of the locking collar to the first position prevents removal of the hitch head assembly, and wherein rotation of the locking collar to the second position allows removal of the hitch head assembly;
  b) rotating the locking collar from the first position to the second position;
  c) inserting the hitch head assembly into the retaining assembly channel; and
  d) releasing the locking collar from the second position, whereby the release of the locking collar from the second position rotates the locking collar to the first position.

21. The gooseneck hitch assembly of claim 19, wherein the inverted orientation leaves the surface of the towing vehicle substantially free of any obstructions.

22. The gooseneck hitch assembly of claim 1, wherein the locking collar has an opening to selectively receive the hitch head assembly.

* * * * *